May 9, 1939.  W. S. VROOMAN  2,158,017
FLOOR COVERING
Filed Sept. 27, 1937
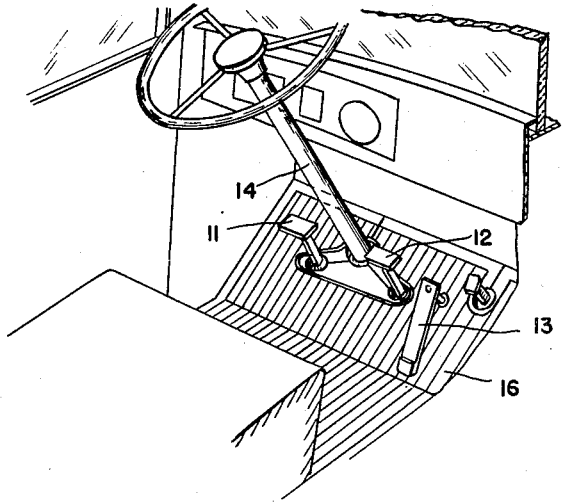
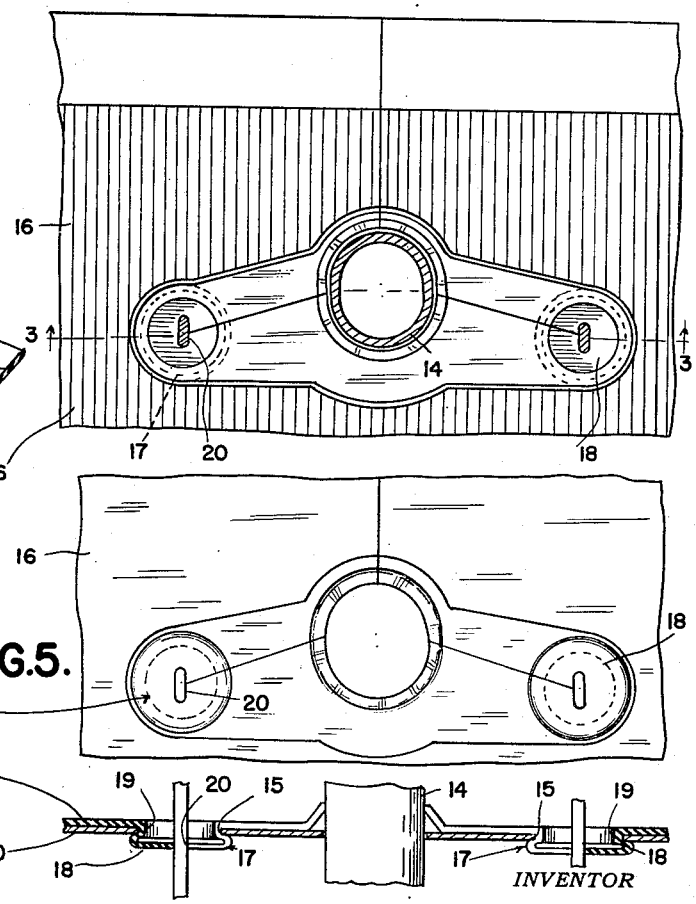
INVENTOR
WILLIAM S. VROOMAN
BY
ATTORNEYS Patented May 9, 1939

2,158,017

UNITED STATES PATENT OFFICE 2,158,017

FLOOR COVERING

William S. Vrooman, Pontiac, Mich., assignor to Baldwin Rubber Company, Pontiac, Mich., a corporation of Michigan Application September 27, 1937, Serial No. 166,018

10 Claims. (Cl. 180—90.6)

This invention relates generally to floor coverings and refers more particularly to improvements in floor mats of the type used in the driver's compartment of vehicle bodies.

Considerable difficulty has been encountered in providing floor mats for the driver's compartment of vehicle bodies which not only present an attractive tailored appearance and lend themselves to economical manufacture but, in addition, effectively seal the openings in the flooring of the vehicle body through which the several controls extend. In less expensive mats, it has been proposed to merely slit the mat for the passage of the vehicle controls so that the sides of the slit portions frictionally engage the controls and, as a consequence, resist the passage of air through the mats into the vehicle body. This particular construction of mat is unsatisfactory in that it allows free passage of air through the openings in the vehicle body flooring beneath the mat and this air ultimately finds its way into the passenger compartments of the body. Also, if the frictional engagement of the sides of the slit portions of the mat with the controls is sufficient to effectively prevent air currents from passing through the mat into the body, it follows that the mat will rise and fall each time the controls are operated. This, of course, is objectionable in that it destroys the tailored appearance of the mat and often times interferes with the operation of the controls. Another type of mat proposed consists in embodying a steel plate in the mat in the region of the controls and in securing this plate to the flooring of the body. This construction prevents displacement of the mat by the vehicle controls, but is expensive to manufacture and is not highly effective in sealing the openings through the flooring.

It is one of the principal objects of this invention to overcome the above objections and otherwise generally improve floor mats of the type set forth by providing a relatively inexpensive floor mat which effectively prevents the entrance of air through the openings in the flooring for the vehicle controls and, in addition, positively prevents rise and fall of the mat by the vehicle controls when the latter are manipulated. As a result, the mat presents a neat and pleasing appearance at all times.

A further object of this invention consists in the provision of a floor mat embodying integral depending projections having enlarged head portions of greater dimension than certain of the openings in the flooring for the vehicle controls and being compressible to permit extending the same through the openings. These head portions are apertured to snugly receive the vehicle controls and after they are forced through the openings in the flooring they are permitted to expand, with the result that they not only effect a seal around the edges of the openings at the outer side of the flooring, but also function to secure the mat to the flooring.

The above, as well as other objects, will be made more apparent as this description proceeds, especially when considered in connection with the accompanying drawing, wherein:

Figure 1 is a perspective view of a portion of a motor vehicle illustrating my improved floor mat construction;

Figure 2 is a fragmentary plan view of the construction shown in Figure 1;

Figure 3 is a sectional view taken substantially on the line 3—3 of Figure 2;

Figure 4 is a perspective view, partly in section, of one of the fastener elements on the floor mat; and Figure 5 is a bottom plan view of the construction shown in Figure 2.

Referring now more in detail to the drawing, it will be noted that Figure 1 illustrates a portion of a motor vehicle having flooring 10 for the driver's compartment and having a plurality of controls conveniently positioned for manipulation by the operator. For the purpose of illustration, the controls are shown as comprising a clutch operating pedal 11, a brake operating pedal 12, a throttle controlled accelerator pedal 13, and a steering post 14. In accordance with conventional practice, each of the several controls extend through an enlarged opening 15 in the flooring 10 of the driver's compartment and this flooring is covered by a mat 16. The mat 16 is preferably formed of rubber, or a composition of rubber, and is apertured in registration with the openings 15 in the flooring 10 to provide for extending the controls therethrough. The mat is slit in any suitable manner, such as shown in Figure 2, to permit the same to be readily applied to the flooring 10 in assembled relation with the various controls.

It has been mentioned above that difficulty has been encountered in the past in effectively sealing the space around the portions of the controls extending through the openings 15 and at the same time prevent rise and fall of the mat relative to the flooring when either of the several controls are manipulated. This problem is solved in the present instance by prefashioning the mat 16 to provide integral fastener elements 17 formed of the same material as the mat and having enlarged head portions 18 connected to the reduced shank portions 19. The fastener elements 17 are fashioned by displacing portions of the mat 16 laterally from the plane of the top surface of the mat during the molding operation and this may be readily accomplished by merely placing the uncured mat over a mold having projections corresponding in shape to the contour of the fastener elements and applying fluid under pressure against the mat to cure the same to the contour of the mold. In other words, the fastener elements 17 are hollow and the head portions 18 thereof form continuations of the top surface of the mat.

It will, of course, be understood that the diameter of the head portions 18 is greater than the openings 15 through the flooring 10 and that these head portions are sufficiently flexible to permit them to be deformed to the extent required to allow projecting the same through the openings 15 in the flooring 10.

The length of the shank portions 19 of the fastener elements is less than the thickness of the flooring 10 so that the heads 18 of the fastener elements cooperate with undersides of the flooring surrounding the openings 15 to hold the mat under tension against the flooring 10. Also, with this construction, the head portions 18 of the fastener elements have a continuous contact with the undersides of the marginal edge portions of the openings 15, with the result that air and foreign matter are positively prevented from escaping through the openings 15 beneath the mat 16.

Upon reference to Figure 3, it will be noted that the head 18 of each fastener element is formed with an opening 20 therethrough for receiving the controls 11, 12, and 13. The size of these openings is predetermined to snugly contact the sides of the portions of the controls extended therethrough in order to form an effective seal around the latter portions. Attention is also directed to the fact that the wall of the heads of the fastener elements is sufficiently flexible to permit limited lateral movement of the controls relative to the flooring during operation of the controls.

Thus, from the foregoing, it will be noted that my improved floor mat not only effectively seals the space around the several controls from the entrance of air either through or beneath the mat but, in addition, is securely held against the flooring. It will also be seen from the foregoing that the mat lends itself to economical manufacture and may be readily installed.

What I claim as my invention is:

1. A covering for the flooring of a motor vehicle body having a control element extending through an opening in the flooring comprising a mat covering the flooring in the region of the control, and means for securing the mat to the flooring including a fastener element on the mat extending through the opening in the flooring and apertured for the passage of said control element.

2. A covering for the flooring of a motor vehicle body having a control element extending through an opening in the flooring comprising a mat having an integral fastener element extending through said opening and apertured for the passage of the control element.

3. A covering for the flooring of a motor vehicle body having a control element extending through an opening in the flooring, comprising a mat covering the flooring in the region of the control element, and means on said mat for securing the same to the flooring including a fastener element having an enlarged head extending through the opening in the flooring and engageable with the marginal edges of the opening at the underside of the flooring and being apertured for the passage of the control element.

4. A covering for the flooring of a motor vehicle body having a control element extending through an opening in the flooring, comprising a mat having a depressed portion forming a fastener element of sufficient dimension to extend through the opening in intimate contacting relation with the edges of said opening and having an aperture therethrough for the passage of the control element.

5. A covering for the flooring of a motor vehicle body having a control element extending through an opening in the flooring, comprising a mat having a depressed portion provided with an enlarged head insertable through the opening in the flooring and engageable with the marginal edges of the opening at the underside of the flooring and having an aperture therethrough for the passage of the control element.

6. A covering for the flooring of a motor vehicle body having a control element extending through an opening in the flooring comprising a mat covering the flooring in the region of the control element, and means for securing the mat to the flooring including a flexible fastener element having an enlarged head of greater dimension than the opening and provided with an aperture therethrough for the passage of the control element, said head being sufficiently flexible to permit the same to be deformed to the extent required to extend the same through the opening in the flooring and adapted to engage the marginal edges of the opening at the underside of the flooring.

7. A covering for the flooring of a motor vehicle body having a control element extending through an opening in the flooring, comprising a flexible mat having a depressed portion provided with an enlarged head apertured to snugly receive the control element, said head being sufficiently flexible to permit deforming the same to the extent required to extend the head through the opening in the flooring and having a portion engageable with the underside of the flooring around the marginal edges of the opening.

8. A covering for the flooring of a motor vehicle body having a control element extending through an opening in the flooring, comprising a mat covering the flooring in the region of the control element, and a fastener element cooperating with the marginal edges of the opening in the flooring to secure the mat to the flooring and having an opening therethrough for the passage of the control element.

9. A covering for the flooring of a motor vehicle body having control elements extending through openings in the flooring, comprising a flexible mat having depressed portions registering with the openings and provided with enlarged heads of greater dimension than the openings, said heads having openings therethrough for the passage of the control elements and being sufficiently flexible to permit the same to be deformed to the extent required to extend the heads through the openings into engagement with the underside of the flooring around the marginal edges of the openings.

10. A covering for the flooring of a motor vehicle body, comprising a molded resilient rubber mat having a depressed portion provided with an enlarged head spaced below the plane of the mat, said depressed portion and head forming a hollow fastener element and said head being compressible to provide for extending the same through an opening in the flooring smaller than the head and being effective upon returning to its normal shape to engage the underside of the flooring adjacent the marginal edges of the opening.

WILLIAM S. VROOMAN.